United States Patent
Hikida

(10) Patent No.: US 9,438,808 B2
(45) Date of Patent: Sep. 6, 2016

(54) IMAGE CAPTURE CONTROL APPARATUS, METHOD OF LIMITING CONTROL RANGE OF IMAGE CAPTURE DIRECTION, AND STORAGE MEDIUM

(71) Applicant: CANON KABUSHIKI KAISHA, Tokyo (JP)

(72) Inventor: Yoshiro Hikida, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 13/738,021

(22) Filed: Jan. 10, 2013

(65) Prior Publication Data

US 2013/0194444 A1     Aug. 1, 2013

(30) Foreign Application Priority Data

Jan. 31, 2012   (JP) ................................ 2012-018642

(51) Int. Cl.
  *G03B 17/00* (2006.01)
  *H04N 5/232* (2006.01)
(52) U.S. Cl.
  CPC .......... *H04N 5/23296* (2013.01); *H04N 5/232* (2013.01); *H04N 5/23235* (2013.01)
(58) Field of Classification Search
  USPC ....................................................... 396/427
  See application file for complete search history.

(56) References Cited

U.S. PATENT DOCUMENTS

| | | | |
|---|---|---|---|
| 7,746,384 B2 * | 6/2010 | Saitou et al. | 348/222.1 |
| 7,796,161 B2 * | 9/2010 | Oya | 348/211.6 |
| 2002/0089523 A1 * | 7/2002 | Hodgkinson | 345/660 |
| 2007/0242936 A1 * | 10/2007 | Chujo | G03B 17/00 396/55 |
| 2009/0096885 A1 * | 4/2009 | Robinson | H04N 5/23293 348/222.1 |
| 2009/0122159 A1 * | 5/2009 | Sakaue et al. | 348/231.99 |
| 2010/0321495 A1 | 12/2010 | Oya | |

FOREIGN PATENT DOCUMENTS

JP     4324030 B2     9/2009

* cited by examiner

*Primary Examiner* — WB Perkey
*Assistant Examiner* — Dennis Hancock
(74) *Attorney, Agent, or Firm* — Fitzpatrick, Cella, Harper & Scinto

(57) ABSTRACT

An image capture control apparatus for controlling the image capture direction of an image capture unit limits the control range of the image capture direction to part of a range where the image capture direction is changeable, and generates, based on the output of the image capture unit, an image having an aspect ratio selected from a plurality of aspect ratios.

17 Claims, 5 Drawing Sheets

IMAGE CAPTURE CONTROL APPARATUS, METHOD OF LIMITING CONTROL RANGE OF IMAGE CAPTURE DIRECTION, AND STORAGE MEDIUM

BACKGROUND OF THE INVENTION

1. Field of the Invention

The present invention relates to an image capture control apparatus, a method of limiting the control range of an image capture direction, and a storage medium.

2. Description of the Related Art

A conventional panhead camera capable of performing pan and tilt operations does not simultaneously generate a plurality of images having different aspect ratios, or does not have a visible range limiting function of limiting the operation range of the panhead. For example, U.S. Pat. No. 7,796,161 discloses a camera control apparatus having a function (visible range limiting function) of limiting the visible (visual field) range that limits the operation range of a panhead.

However, the camera control apparatus disclosed in U.S. Pat. No. 7,796,161 does not simultaneously generate a plurality of images having different aspect ratios. When caused to simultaneously capture a plurality of images having different aspect ratios, the camera control apparatus captures a region outside the visible range limited region or cannot entirely capture the visible range limited region.

SUMMARY OF THE INVENTION

The present invention enables to distribute images having different aspect ratios and also distribute an image of a whole range where image capture is permitted without distributing any image outside the range where image capture is permitted.

According to one aspect of the present invention, there is provided an image capture control apparatus for controlling an image capture direction of an image capture unit, comprising: a limiting unit configured to limit a control range of the image capture direction to part of a range where the image capture direction is changeable; and a generation unit configured to generate, based on an output of the image capture unit, an image having an aspect ratio selected from a plurality of aspect ratios.

Further features of the present invention will become apparent from the following description of exemplary embodiments with reference to the attached drawings.

DESCRIPTION OF THE EMBODIMENTS

Figure 1:
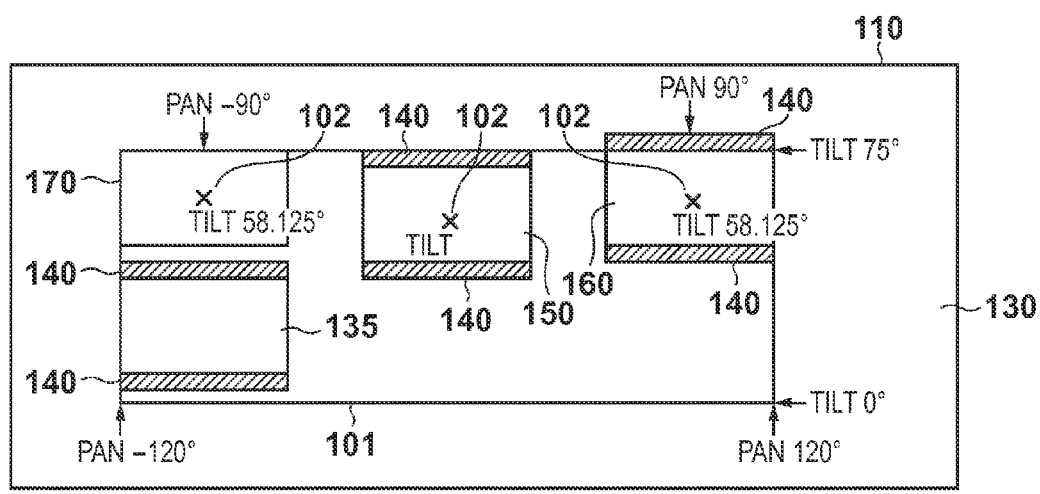
FIG. 1 is a view showing an example of a visible range limited region.

A camera control apparatus according to the first embodiment of the present invention will be described based on the accompanying drawings. FIG. 1 is a view showing an example of a visible range limited region (limited range) 101 of an image capture control apparatus (camera control apparatus) according to the first embodiment. The camera is, for example, a surveillance camera that can control the image capture direction and the like based on an operation instruction sent from a remote client (information processing apparatus), and distributes videos to the client that is the distribution destination of captured videos.

The visual field range (visible range) where the camera can capture an image is indicated by 110. When the visible range limited region (limited range) 101, which is a range where distribution is permitted out of the visible range, is determined, the image capture control apparatus controls the image capture range of the camera so as to prohibit image capture in a region (image capture prohibited range 130) outside the range of the visible range limited region 101. Videos the client can see are limited within the visible range limited region 101.

The image of the visible range limited region 101 can be displayed on a display unit 223 of a client (information processing apparatus) 250 (FIG. 2) as a GUI or displayed on a display device directly connected to an image capture control apparatus 210. A position designation operation on the GUI can be done via an input unit 222 of the client 250.

The visible range limited region 101 is defined by the minimum and maximum values of TILT and the minimum and maximum values of PAN. The minimum value of TILT in the visible range limited region 101 in FIG. 1 is 0°, and the maximum value is 75°. The minimum value of PAN is −120°, and the maximum value is 120°.

Figure 2:
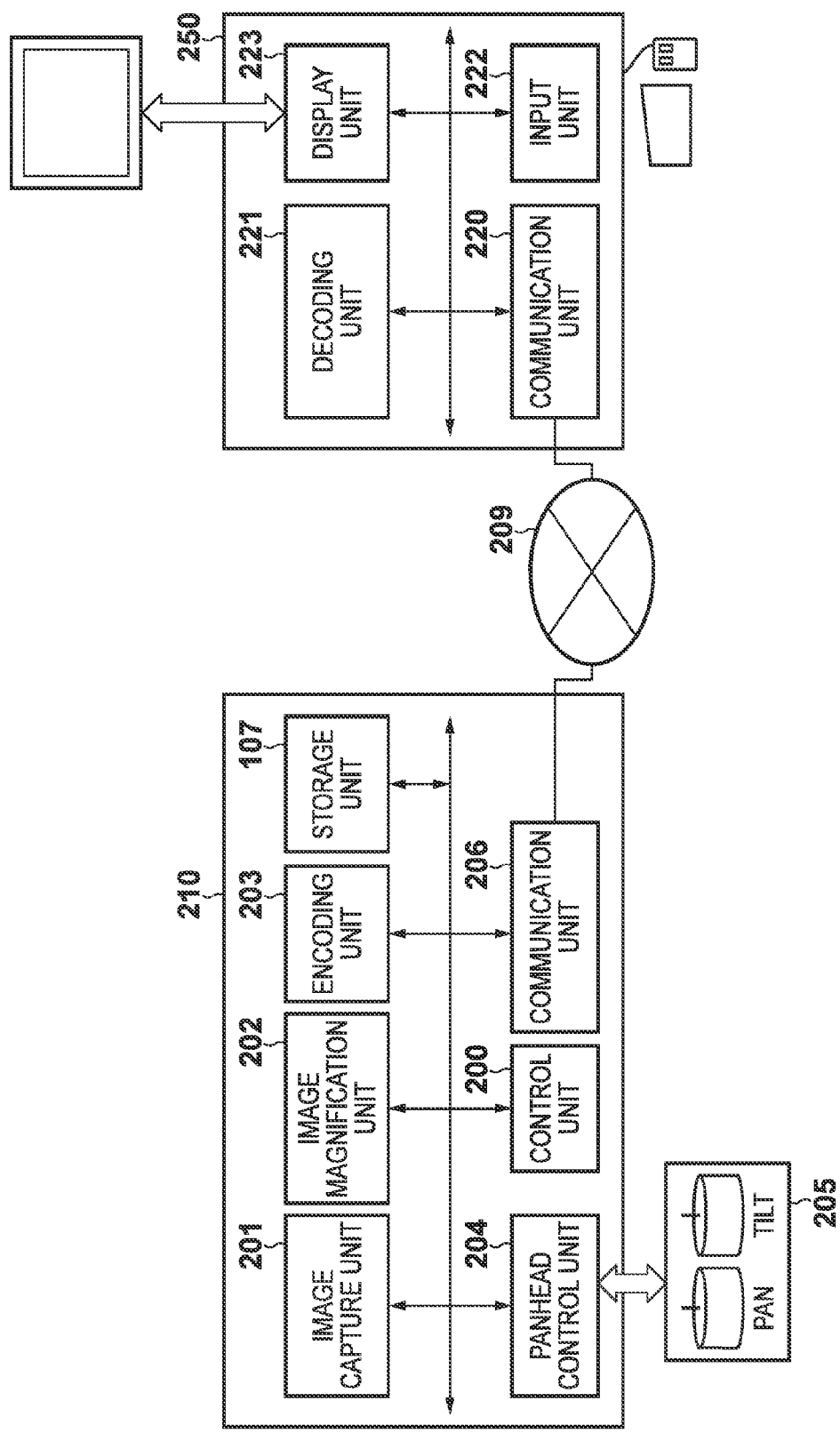
FIG. 2 is a block diagram showing the arrangement of an image capture control apparatus.
Figure 4B:
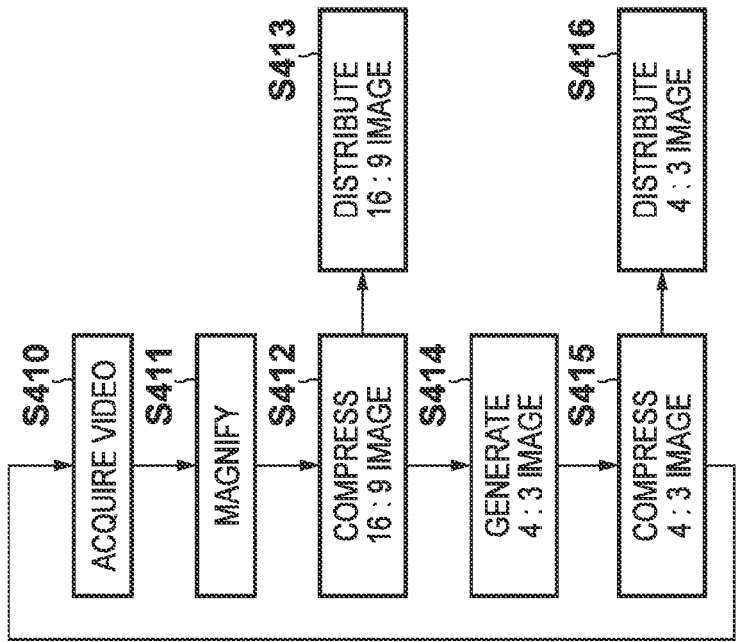
FIGS. 4A and 4B are flowcharts for explaining the procedure of first processing of the image capture control apparatus.
Figure 4A:
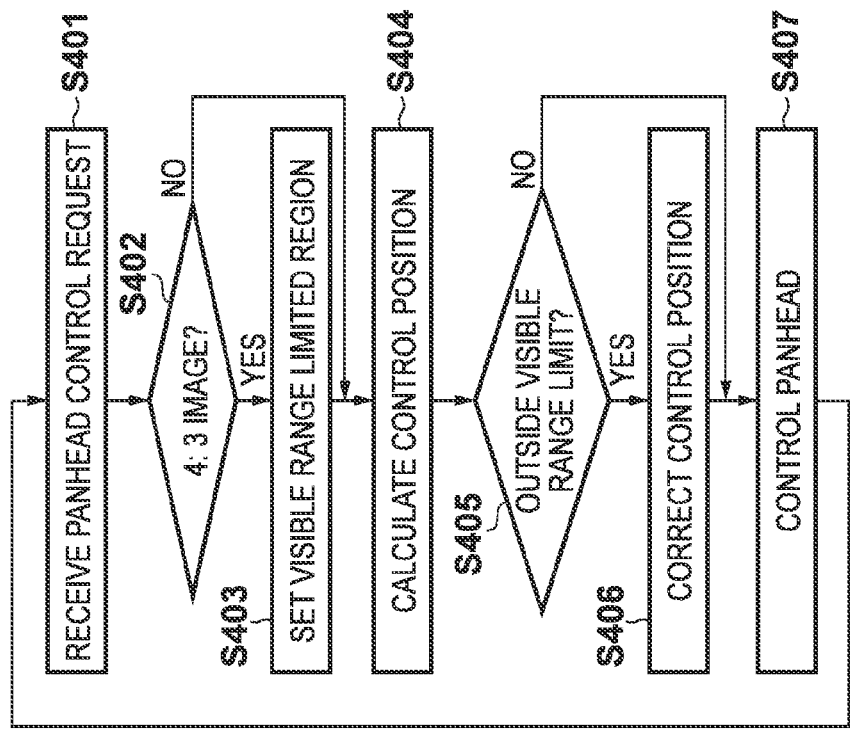

FIG. 2 is a block diagram showing the arrangement of the image capture control apparatus 210 according to this embodiment. FIG. 4A is a flowchart for explaining the procedure of processing of a panhead control unit 204. FIG. 4B is a flowchart for explaining the procedure of processing of a control unit 200. The panhead control unit 204 and the control unit 200 can be formed as a computer that reads out and executes computer programs stored in a storage unit 107. The storage unit 107 is a storage medium that stores the computer programs such that the panhead control unit 204 and the control unit 200 can read out them. FIG. 2 shows part of the computer programs to be executed by the panhead control unit 204 and the control unit 200.

An example will be explained here in which the image capture control apparatus 210 simultaneously outputs (distributes) a 480×270 pixel image having an aspect ratio of 16:9 and a 480×360 pixel image having an aspect ratio of 4:3 as a plurality of images having different aspect ratios. Note that in this embodiment, 480×45 pixel invalid image data is added to each of the upper and lower sides of the 480×270 pixel image having an aspect ratio of 16:9, thereby generating the 480×360 pixel image having an aspect ratio of 4:3. In this embodiment, the image capture direction is controlled independently of the aspect ratio of the image to be distributed such that the 480×270 pixel image having an aspect ratio of 16:9 fits in the visible range limited region. If a range that cannot fit in the visible range limited region is designated from the client 250, the image capture direction is controlled to make the range fit in the visible range limited region.

First, the panhead control unit 204 receives a panhead operation instruction transmitted from the client 250 via a communication network 209 (network) (step S401). The panhead control unit 204 determines whether the image to be transmitted to the client that has output the panhead operation instruction is an image having an aspect ratio of 4:3 (step S402). If the image is not an image having an aspect ratio of 4:3 (for example, the aspect ratio is 16:9), the process advances to step S404. On the other hand, upon determining in step S402 that the image is an image having an aspect ratio of 4:3 (YES in step S402), the process advances to step S403 to set the visible range limited region (limited range) 101 (step S403).

For example, if the visible range limited region 101 is set based on an image 150 having added invalid regions 140 shown in FIG. 1, the region (invalid region 140) on the upper side of the image 150, which cannot be captured, is included in the visible range limited region 101. Hence, correction processing is performed for the image having an aspect ratio of 4:3. The center of the image is set as a control position (image capture direction) 102. In the correction processing, the number of pixels (45 pixels) added as the invalid region is subtracted from 180 pixels on each of the upper and lower sides (tilt direction) of the control position 102 in the 480×360 pixel image (aspect ratio is 4:3), thereby obtaining a range. The position that gives a range of 135 pixels (=180 pixels−45 pixels) on each of the upper and lower sides (tilt direction) centered on the control position 102 is the control position when limiting the visible range. When the 45 pixels added as the invalid region 140 are subtracted, the upper invalid region 140 (45 pixels) added to an image 160 is not included in the visible range limited region 101 (image 170 in FIG. 1).

Even when distributing an image having an aspect ratio of 4:3, the visible range limited region 101 is set based on the image having an aspect ratio of 16:9. For the lower invalid region 140 as well, the control position 102 is set in a similar manner, thereby enabling to capture the entire visible range limited region 101 for the image having an aspect ratio of 4:3 and the image having an aspect ratio of 16:9.

When the setting processing is completed, in step S404, the panhead control unit 204 calculates the control position 102 designated by the panhead operation instruction (control position calculation). The panhead control unit 204 then determines whether or not to capture a region outside the range of the visible range limited region 101 at the designated control position 102 (step S405). If a region outside the range of the visible range limited region 101 is not to be captured (NO in step S405), the process advances to step S407. On the other hand, upon determining in step S405 to capture a region outside the range of the visible range limited region 101 (YES in step S405), the process advances to step S406.

In step S406, the panhead control unit 204 corrects the control position 102 and moves it inward by the angles of view of the image to be captured (control position correction). When capturing an image having an aspect ratio of 16:9, the angle of view is assumed to be 60° in the horizontal direction and 33.75° in the vertical direction. The panhead operation range is assumed to be ±170° in the pan direction and −10° to 90° in the tilt direction. When the visible range limited region is not applied, and the control position 102 is moved up to the operation range limit, the image capture enable range is ±200° in the pan direction and −26.875° to 106.875° in the tilt direction. The angle of view per pixel of the image is 0.125° in both the horizontal and vertical directions. The visible range limited region 101 is set to ±120° in the pan direction and 0° to 75° in the tilt direction. The panhead control unit 204 acquires information about TILT and PAN from information (PAN, TILT) saved in a storage unit 205. The panhead control unit 204 saves, in the storage unit 205, the information of TILT and PAN used to correct the control position.

The panhead operation instruction designated from the client is the designation of the center position of the image. The designated position is defined as the control position (image capture direction) 102. If the panhead operation instruction is designated as 90° in the pan direction and 60° in the tilt direction, the image capture range is 76.875° in the tilt direction, and a region outside the visible range limited region (limited range) 101 is captured in the tilt direction.

For this reason, the panhead control unit 204 limits the operation in the tilt direction. To make range fit to an angle of view of 75° or less, 1.875° is subtracted from 60° that is the designated panhead operation position, thereby correcting the control position to 58.125° (=60°−1.875°). When the control position 102 is corrected (step S406), the process advances to step S407. In step S407, the panhead control unit 204 moves the panhead to the designated control position 102 (panhead control). In this panhead control, distribution of each of the plurality of images having different aspect ratios is limited to the visible range limited region (limited range).

Next, an image capture unit 201 captures a 1920×1080 pixel image at the corrected control position 102 under the control of the control unit 200 (step S410) and sends the data to an image magnification unit 202. The image magnification unit 202 that has received the image performs magnification processing (reduction magnification) (step S411), thereby generating a 480×270 pixel image having an aspect ratio of 16:9 (image having a first aspect ratio).

An encoding unit 203 generates a compressed image of the 480×270 pixel image having an aspect ratio of 16:9, which has undergone the magnification processing (reduction magnification) of the image magnification unit 202 (step S412). A communication unit 206 transmits the compressed image generated by the encoding unit 203 to the client 250 via the communication network 209 (network) (step S413).

Next, the image magnification unit 202 generates 480×45 pixel invalid image data. The region of the 480×45 pixel invalid image data is set as the invalid region 140. The image magnification unit 202 adds the invalid image data (invalid region 140) to the number of tilt-direction pixels on each of the upper and lower sides of a 480×270 pixel image 135, thereby generating a 480×360 pixel image having an aspect ratio of 4:3 (image having a second aspect ratio) (step S414).

The encoding unit 203 generates a compressed image of the 480×360 pixel image having an aspect ratio of 4:3, which includes the invalid region 140 on each of the upper and lower sides (tilt direction) of the image 135 (step S415). The communication unit 206 transmits the generated compressed image of the 480×360 pixel image having an aspect ratio of 4:3 to the client 250 via the communication network 209 (network) (step S416).

A communication unit 220 receives the compressed image transmitted from the image capture control apparatus 210. A decoding unit 221 decodes the compressed image. The display unit 223 displays the image decoded by the decoding unit 221.

As described above, in this embodiment, the image capture direction is controlled independently of the aspect ratio of the image to be distributed such that the 480×270 pixel image having an aspect ratio of 16:9 fits in the visible range limited region. If a range that cannot fit in the visible range limited region is designated from the client 250, the image capture direction is controlled to make the range fit in the visible range limited region.

According to this embodiment, it is possible to capture an image having an aspect ratio of 4:3 and an image having an aspect ratio of 16:9 in the entire visible range limited region from the corrected control position (image capture direction) 102 without capturing a region outside the range of the visible range limited region (limited range) 101.

Figure 3:
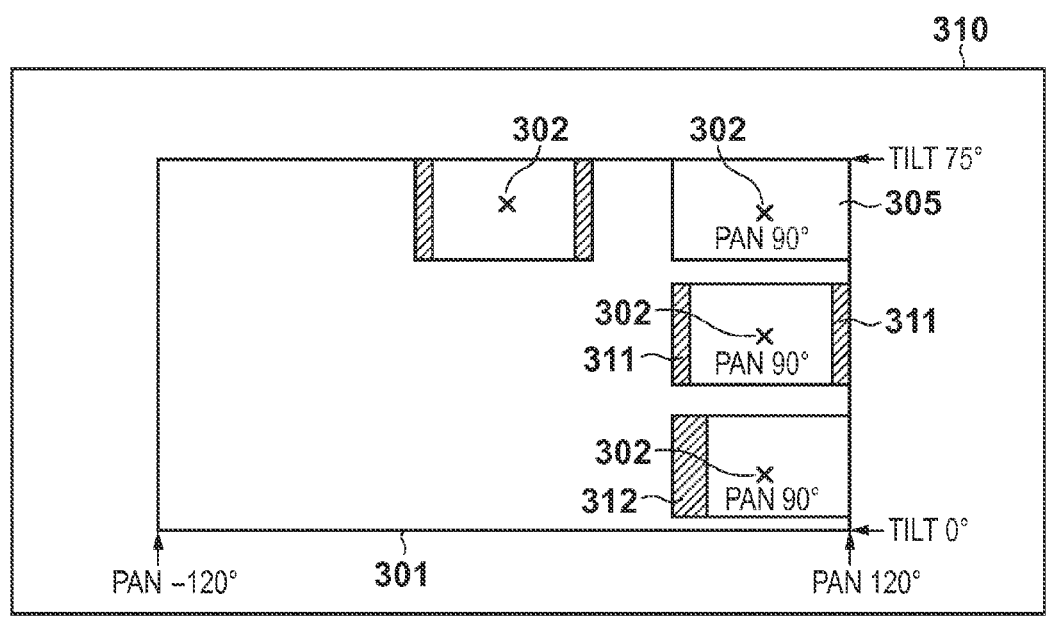
FIG. 3 is a view showing an example of a visible range limited region.

An image capture control apparatus according to the second embodiment of the present invention will be described based on the accompanying drawings. FIG. 3 is a view showing an example of a visible range limited region (limited range) 301 of the image capture control apparatus according to the second embodiment. In this embodiment, an example will be explained in which the image capture control apparatus simultaneously outputs (distributes) a 480×270 pixel image having an aspect ratio of 16:9 and a 360×270 pixel image having an aspect ratio of 4:3 as a plurality of images having different aspect ratios. The 360×270 pixel image having an aspect ratio of 4:3 is generated by trimming a 60 pixel image at each of the left and right (pan direction) edges of the 480×270 pixel image having an aspect ratio of 16:9. A block diagram showing the arrangement of an image capture control apparatus 210 is the same as FIG. 2 described in the first embodiment.

Figure 5B:
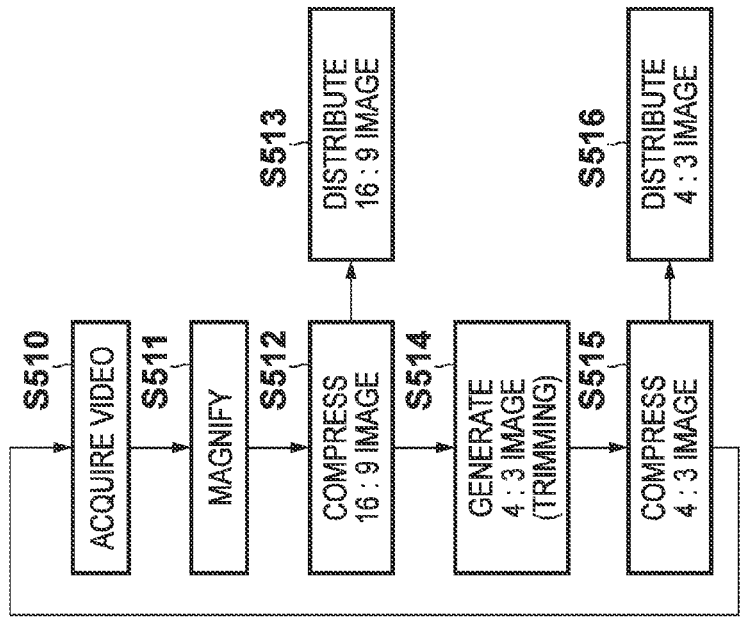
FIGS. 5A and 5B are flowcharts for explaining the procedure of second processing of the image capture control apparatus.
Figure 5A:
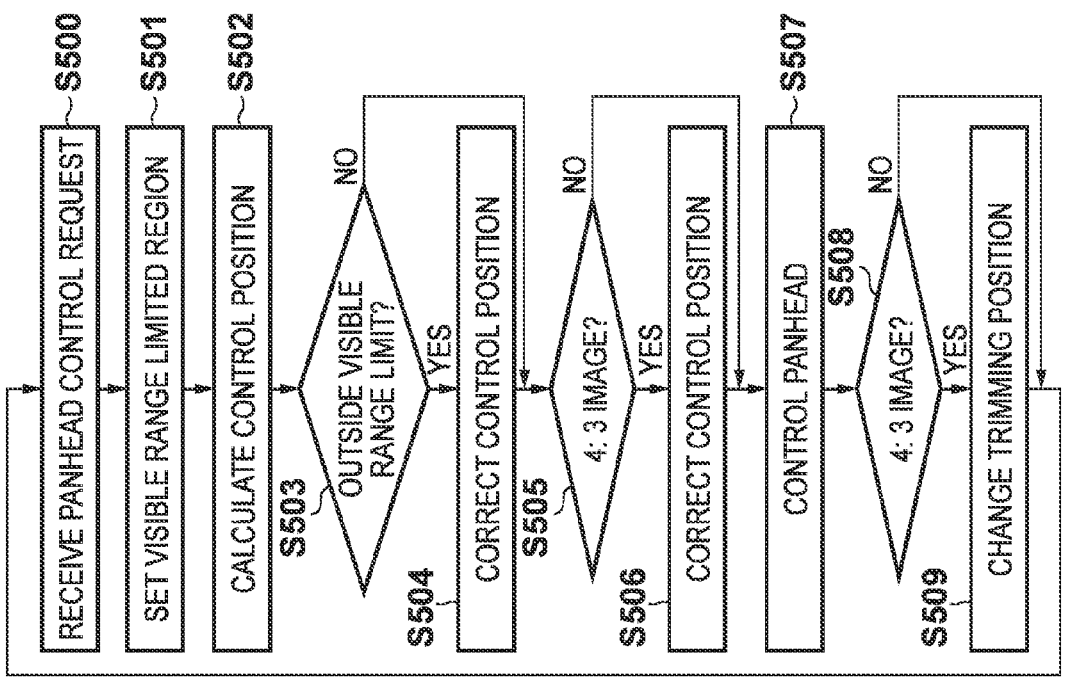

FIG. 5A is a flowchart for explaining the procedure of processing of a panhead control unit 204. FIG. 5B is a flowchart for explaining the procedure of processing of a control unit 200. Like FIG. 2, FIGS. 5A and 5B show part of computer programs to be executed by the panhead control unit 204 and the control unit 200.

First, the panhead control unit 204 receives a panhead operation instruction transmitted from a client 250 via a communication network 209 (network) (step S500) and sets the visible range limited region 301 (FIG. 3) (step S501). The panhead control unit 204 then calculates a control position 302 (FIG. 3) designated by the operation instruction (step S502). The panhead operation instruction designated from the client is the designation of the center position of the image. The panhead control unit 204 calculates the designated position as the control position 302. When the control position 302 that is the center position of the image is calculated, the range to capture an image having a predetermined aspect ratio about the control position 302 can be decided.

The panhead control unit 204 then determines whether or not to capture a video outside the range of the visible range limited region 301 from the calculated control position 302 (step S503). This determination is done based on the image of the aspect ratio to be transmitted to the client 250. If no video is to be captured outside the range of the visible range limited region 301 (NO in step S503), the process advances to step S505. On the other hand, upon determining in step S503 to capture a video outside the range of the visible range limited region (YES in step S503), the process advances to step S504. When capturing a video outside the range of the visible range limited region 301, the image capture range extends off the visible range limited region 301 without correction of the control position 302. Hence, the panhead control unit 204 controls the control position to the position of the operation limit where the visible range fits in the visible range limited region 301 (step S504).

Next, the panhead control unit 204 determines whether the image to be transmitted to the client 250 that has output the operation instruction is an image having an aspect ratio of 4:3 (step S505). If the image is not an image having an aspect ratio of 4:3 (NO in step S505), the process advances to step S507. On the other hand, upon determining in step S505 that the image is an image having an aspect ratio of 4:3 (YES in step S505), the process advances to step S506 to correct the control position (step S506).

If the aspect ratio is 4:3, the image size is 360×270 pixels. This image is generated by trimming a 60 pixel image (removed image 311) at each of the left and right (pan direction) edges of a 480×270 pixel image having an aspect ratio of 16:9 (for example, image 305 in FIG. 3). For this reason, when the visible range limited region 301 is set based on an image having an aspect ratio of 16:9, the region (right side) of the removed image 311 cannot be captured in the visible range limited region 301 for an image having an aspect ratio of 4:3. Hence, in step S506, the panhead control unit 204 corrects the control position 302 in the horizontal direction (pan direction) so that the image capture range fits in the visible range limited region 301 even for an image having an aspect ratio of 4:3 obtained by trimming the removed image 311 (control position correction).

When capturing an image having an aspect ratio of 16:9, the angle of view is assumed to be 60° in the horizontal direction and 33.75° in the vertical direction. The panhead operation range is assumed to be ±170° in the pan direction and −10° to 90° in the tilt direction. When the visible range limited region is not applied, and the control position 302 is moved up to the operation range limit, the image capture enable range is ±200° in the pan direction and −26.875° to 106.875° in the tilt direction. The angle of view per pixel of the image is 0.125° in both the horizontal and vertical directions. The visible range limited region 301 is set to ±120° in the pan direction and 0° to 75° in the tilt direction. The panhead operation instruction designated from the client is the designation of the center position of the image. The designated position is defined as the control position 302.

If the panhead operation instruction is designated as 97.50° in the pan direction and 40° in the tilt direction, the image capture range of an image having an aspect ratio of 4:3 is 120.00° in the pan direction and 56.875° in the tilt direction, which fits in the visible range limited region (±120° in the pan direction and 0° to 75° in the tilt direction) (NO in step S503 and YES in step S505). However, a 480×270 pixel image having an aspect ratio of 16:9, which is transmitted simultaneously, is captured up to 127.50° in the pan direction, and a region outside the visible range limited region 301 is captured.

For this reason, the panhead control unit 204 limits the operation in the pan direction. To make range fit to an angle of view of 120°, 7.50° is subtracted from 97.50° in the pan direction, which is designated by the panhead operation instruction, thereby correcting the control position in the pan direction to 90.00°. When the control position 302 is corrected (step S506), the process advances to step S507. In step S507, the panhead control unit 204 moves the panhead to the designated control position 302 (panhead control).

In step S508, the panhead control unit 204 further determines whether the image to be distributed is an image having an aspect ratio of 4:3 (step S508). When distributing an image having an aspect ratio of 4:3, the image capture position is corrected by changing the trimming position because the control position has been limited by the correction processing performed in step S504 described above (step S509). For a video having an aspect ratio of 4:3, the pan control position is corrected by 7.50° (for example, leftward) by the control position correction processing (step S506). At this position, the entire visible range limited region cannot be captured. For this reason, the trimming position is corrected by 60 pixels (corresponding to 7.50°) (for example, rightward). When the trimming position is corrected rightward, the width of the left removed image 311 increases. The removed image whose trimming position has been corrected is indicated by 312 in FIG. 3. In this correction, distribution of each of the plurality of images having different aspect ratios is limited to the visible range limited region (limited range).

Next, an image capture unit 201 captures a 1920×1080 pixel image at the corrected control position 302 under the control of the control unit 200 (step S510) and sends the data to an image magnification unit 202. The image magnification unit 202 that has received the image performs magnification processing (step S511), thereby generating a 480×270 pixel image having an aspect ratio of 16:9.

An encoding unit 203 generates a compressed image of the 480×270 pixel image that has undergone the magnification processing of the image magnification unit 202 (step S512). A communication unit 206 transmits the compressed image generated by the encoding unit 203 to the client 250 via the communication network 209 (network) (step S513).

Next, the image magnification unit 202 generates a 360×270 pixel image having an aspect ratio of 4:3 by trimming the left and right edges of the 480×270 pixel image having an aspect ratio of 16:9 (step S514). If the trimming position has been changed in step S509, the trimming is performed at the changed position. If the trimming position has not been changed, 60 pixels are trimmed on each of the left and right sides. The encoding unit 203 generates a compressed image of the 360×270 pixel image having an aspect ratio of 4:3, which has undergone the trimming processing of the image magnification unit 202 (step S515). The communication unit 206 transmits the compressed image generated by the encoding unit 203 to the client 250 via the communication network 209 (network) (step S516).

A communication unit 220 receives the compressed image transmitted from the image capture control apparatus 210. A decoding unit 221 decodes the compressed image. A display unit 223 displays the image decoded by the decoding unit 221.

In this embodiment as well, the image capture direction may be controlled independently of the aspect ratio of the image to be distributed such that the 480×270 pixel image having an aspect ratio of 16:9 fits in the visible range limited region. If a range that cannot fit in the visible range limited region is designated from the client 250, the image capture direction is controlled to make the range fit in the visible range limited region. When generating the 360×270 pixel image having an aspect ratio of 4:3 by trimming the 480×270 pixel image having an aspect ratio of 16:9, the trimming position is adjusted such that the entire visible range limited region can visually be recognized.

According to this embodiment, it is possible to capture an image having an aspect ratio of 4:3 and an image having an aspect ratio of 16:9 in the entire visible range limited region from the corrected control position 302 without capturing a region outside the range of the visible range limited region (limited range) 301.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-018642, filed Jan. 31, 2012, which is hereby incorporated by reference herein in its entirety.

What is claimed is:

1. An image capture control apparatus for controlling an image capture direction of an image capture unit, comprising:
   a limiting unit configured to limit an output image output by the image capture control apparatus to part of a range where the image capture unit can capture by changing the image capture direction;
   a generation unit configured to generate, based on a first output image of a first aspect ratio output by the image capture unit under limitation by the limiting unit to the part of the range where the image capture unit can capture, a second output image of a second aspect ratio under the limitation by the limiting unit to the part of the range where the image capture unit can capture; and
   an output unit configured to output the second output image of the second aspect ratio via a communication network,
   wherein said generation unit generates the second output image of the second aspect ratio to have a first side contacting with a first side of the part of the range where the image capture unit can capture, without removing, from the first output image, a region configured by a first side of the first output image contacting with the first side of the part of the range where the image capture unit can capture, but by removing, from the first output image, a region configured by a second side of the first output image opposite to the first side of the first output image.

2. The apparatus according to claim 1, wherein said limiting unit limits a control range of the image capture direction not to capture an image outside a set range.

3. The apparatus according to claim 1, wherein the output unit outputs both the first image having the first aspect ratio output from said image capture unit and the second image having the second aspect ratio.

4. The apparatus according to claim 1, further comprising an acceptance unit configured to accept selection of the aspect ratio of the image to be output by the output unit from the plurality of aspect ratios.

5. The apparatus according to claim 1, wherein said generation unit generates the second output image having an aspect ratio of 4:3 from the first output image having an aspect ratio of 16:9 output from said image capture unit.

6. A method of limiting an output image output by an image capture apparatus, comprising:
   setting limitation on an output image output by the image capture apparatus to part of a range where an image capture unit of the image capture apparatus can capture by changing an image capture direction of the image capture unit;
   generating, based on a first output image of a first aspect ratio output by the image capture unit under the limitation set in the setting step to the part of the range where the image capture unit can capture, a second output image of a second aspect ratio under the limitation set in the setting step to the part of the range where the image capture unit can capture; and outputting both the first output image of the first aspect ratio and the second output image of the second aspect ratio via a communication network, wherein the second output image of the second aspect ratio is generated to have a first side contacting with a first side of the part of the range where the image capture unit can capture, without removing, from the first output image, a region configured by a first side of the first output image contacting with the first side of the part of the range where the image capture unit can capture, but by removing, from the first output image, a region configured by a second side of the first output image opposite to the first side of the first output image.

7. The method according to claim 6, wherein in the setting step, a control range of the image capture direction is limited not to capture an image outside a set range.

8. The method according to claim 6, wherein both the first image having the first aspect ratio output from the image capture unit and the second image having the second aspect ratio is output in the outputting step.

9. A non-transitory storage medium storing a computer program configured to limit an output image output by an image capture apparatus, the computer program causing a computer to execute:

a setting step of setting limitation on an output image output by the image capture apparatus to part of a range where an image capture unit of the image capture apparatus can capture by changing an image capture direction of the image capture unit;

a generation step of generating, based on a first output image of a first aspect ratio output by the image capture unit under the limitation set in the setting step to the part of the range where the image capture unit can capture, a second output image of a second aspect ratio under the limitation set in the setting step to the part of the range where the image capture unit can capture; and an output step of outputting both the first output image of the first aspect ratio and the second output image of the second aspect ratio via a communication network, wherein the second output image of the second aspect ratio is generated to have a first side contacting with a first side of the part of the range where the image capture unit can capture without removing, from the first output image, a region configured by a first side of the first output image contacting with the first side of the part of the range where the image capture unit can capture, but by removing, from the first output image, a region configured by a second side of the first output image opposite to the first side of the first output image.

10. The non-transitory storage medium according to claim 9, wherein in the setting step, a control range of the image capture direction is limited not to capture an image outside a set range.

11. The non-transitory storage medium according to claim 9, wherein both the first image having the first aspect ratio output from the image capture unit and the second image having the second aspect ratio is output in the output step.

12. An image capture control apparatus for controlling an image capture direction of an image capture unit, comprising:

a limiting unit configured to limit an output image output by the image capture control apparatus to part of a range where the image capture unit can capture by changing the image capture direction;

a control unit configured to control the image capture direction based on the part of the range;

a determination unit configured to determine a region to be removed from a first output image of a first aspect ratio captured based on the image capture direction, controlled by the control unit, so that a contour of the region to be removed is opposite to a side of the first output image that contacts with a boundary line of the part of the range; and a generation unit configured to generate, by removing the region determined by the determination unit from the first output image of the first aspect ratio, a second output image of a second aspect ratio including a portion of the first output image that contacts with the boundary line of the part of the range.

13. The apparatus according to claim 12, wherein said determination unit determines the region to be removed from a second side of the first output image opposite to the side of the first output image that contacts with the boundary line of the part of the range, and said generation unit generates the second output image of the second aspect ratio, to be in contact with the boundary line of the part of the range, without removing, from the first output image, a region of the first output image that contacts with the boundary line of the part of the range, but by removing the region determined by the determination unit from the first output image.

14. A method of limiting an output image output by an image capture apparatus, comprising:

limiting an output image output by the image capture apparatus to part of a range where an image capture unit of the image capture apparatus can capture by changing an image capture direction of the image capture unit;

controlling the image capture direction based on the part of the range;

determining a region to be removed from a first output image of a first aspect ratio captured based on the image capture direction, controlled in the controlling, so that a contour of the region to be removed is opposite to a side of the first output image that contacts with a boundary line of the part of the range; and generating, by removing the determined region from the first output image of the first aspect ratio, a second output image of a second aspect ratio including a portion of the first output image that contacts with the boundary line of the part of the range.

15. The method according to claim 14, wherein the determining step determines the region to be removed from a second side of the first output image opposite to the side of the first output image that contacts with the boundary line of the part of the range, and in the generation step, the second output image of the second aspect ratio has a first side contacting with the boundary line of the range, is generated without removing, from the first output image, a region of the first output image that contacts with the boundary line of the part of the range, but by removing the determined region from the first output image.

16. A non-transitory storage medium storing a computer program configured to limit an output image output by an image capture apparatus, the computer program causing a computer to execute:

a limiting step of limiting output images output by the image capture apparatus to part of a range where an image capture unit of the image capture apparatus can capture by changing an image capture direction of the image capture unit;

a controlling step of controlling the image capture direction based on the part of the range;

a determining step of determining a region to be removed from a first output image of a first aspect ratio captured based on the image capture direction, controlled in the controlling step, so that a contour of the region to be removed is opposite to a side of the first output image that contacts with a boundary line of the part of the range; and a generation step of generating, by removing the determined region from the first output image of a first aspect ratio, a second output image of a second aspect ratio including a portion of the first output image that contacts with the boundary line of the part of the range.

17. The non-transitory storage medium according to claim 16, wherein the determining step determines the region to be removed from a second side of the first output image opposite to the side of the first output image that contacts with the boundary line of the part of the range, and in the generation step, the second output image of the second aspect ratio has a first side contacting with the boundary line of the range, is generated without removing, from the first output image, a region of the first output image that contacts with the boundary line of the part of the range, but by removing the determined region from the first output image.

* * * * *